United States Patent [19]

Kajiwara

[11] Patent Number: 5,587,908
[45] Date of Patent: Dec. 24, 1996

[54] DISTANCE MEASUREMENT DEVICE AND VEHICLE VELOCITY CONTROL DEVICE FOR MAINTAINING INTER-VEHICULAR DISTANCE

[75] Inventor: Yasuya Kajiwara, Himeji, Japan

[73] Assignee: Mitsubishi Denki Kabushiki Kaisha, Tokyo, Japan

[21] Appl. No.: 147,320

[22] Filed: Nov. 5, 1993

[30] Foreign Application Priority Data

Dec. 22, 1992 [JP] Japan .................................. 4-342415

[51] Int. Cl.$^6$ .................................................... B60K 31/04
[52] U.S. Cl. .................................. 364/426.041; 364/561; 364/581; 180/169; 180/170
[58] Field of Search ................ 364/426.04, 431.07, 364/460, 461, 561, 575, 581; 180/169, 170, 179; 123/352; 342/455, 457; 340/901, 903

[56] References Cited

U.S. PATENT DOCUMENTS

| | | | |
|---|---|---|---|
| 4,519,469 | 5/1985 | Hayashi et al. | 180/169 |
| 4,621,705 | 11/1986 | Etoh | 180/169 |
| 4,677,560 | 6/1987 | Cao et al. | 364/431.07 |
| 4,706,195 | 11/1987 | Yoshino et al. | 180/169 |
| 4,749,848 | 6/1988 | Sorimachi | 250/201 |
| 4,829,434 | 5/1989 | Karmel et al. | 364/424.1 |
| 4,926,364 | 5/1990 | Brotherton | 364/575 |
| 5,023,712 | 6/1991 | Kajiwara | 358/105 |
| 5,026,153 | 6/1991 | Suzuki et al. | 180/167 |
| 5,053,979 | 10/1991 | Etoh | 364/461 |
| 5,099,941 | 3/1992 | Kawano et al. | 364/426.04 |
| 5,161,632 | 11/1992 | Asayama | 180/167 |
| 5,162,998 | 11/1992 | Kondo | 180/179 |
| 5,165,497 | 11/1992 | Chi | 364/426.04 |
| 5,166,881 | 11/1992 | Akasu | 364/426.04 |
| 5,216,408 | 6/1993 | Shirakawa | 340/435 |
| 5,257,022 | 10/1993 | Irie | 340/988 |
| 5,278,764 | 1/1994 | Iizuka et al. | 364/460 |
| 5,333,109 | 7/1994 | Oo et al. | 364/431.07 |

FOREIGN PATENT DOCUMENTS

| | | |
|---|---|---|
| 0459225 | 12/1991 | European Pat. Off. . |
| 4109159 | 9/1991 | Germany . |
| 4118605 | 12/1991 | Germany . |
| 1373892 | 11/1974 | United Kingdom . |

OTHER PUBLICATIONS

A. L. Masson, "Automatic Car–Following–A Study of Possible Controllers," 29th IEEE Vehicular Technology Conference, Mar. 27–30, 1979, pp. 37–43.

Primary Examiner—Gary Chin
Attorney, Agent, or Firm—Sughrue, Mion, Zinn, Macpeak & Seas

[57] ABSTRACT

The computer (CPU) of a distance measurement device determines the inter-vehicular distance by applying a software filter (weighing means) upon successive values obtained directly from measurement. A vehicle velocity control device for maintaining the inter-vehicular distance include a distance measurement device for measuring the inter-vehicular distance, and the deviation $\Delta R$ of the inter-vehicular distance with respect to the target inter-vehicle distance $R_S$ is determined. The vehicle velocity is controlled on the basis of the deviation $\Delta R$ in accordance with the PID (proportion plus integral plus differential) control method, and the gains are varied in accordance with the current value of the inter-vehicular distance.

19 Claims, 8 Drawing Sheets

DISTANCE MEASUREMENT DEVICE AND VEHICLE VELOCITY CONTROL DEVICE FOR MAINTAINING INTER-VEHICULAR DISTANCE

BACKGROUND OF THE INVENTION

This invention relates to distance measurement devices, and more particularly to distance measurement devices mounted on automotive vehicles for measuring the inter-vehicular distances (i.e., the distances to preceding vehicles), so as to control the speeds of the vehicles and the inter-vehicular distances. This invention also relates to driving control devices for automotive vehicles for maintaining the distance to the preceding vehicle by controlling the vehicle velocity on the basis of the measurement of the inter-vehicular distance.

Figure 6:
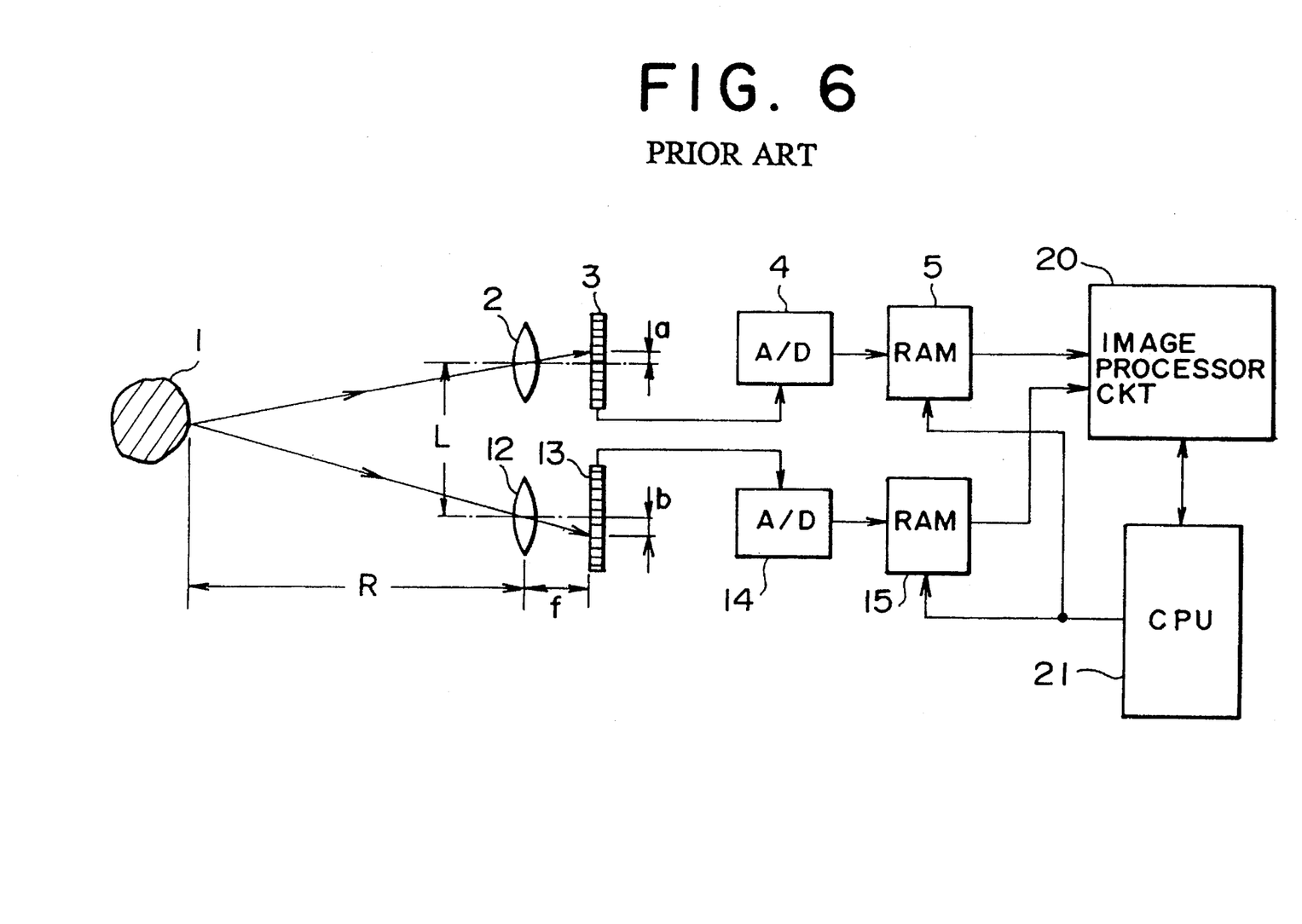
FIG. 6 is a block diagram showing the structure of a trigonometric or triangulation type distance measurement device.
Figure 7:
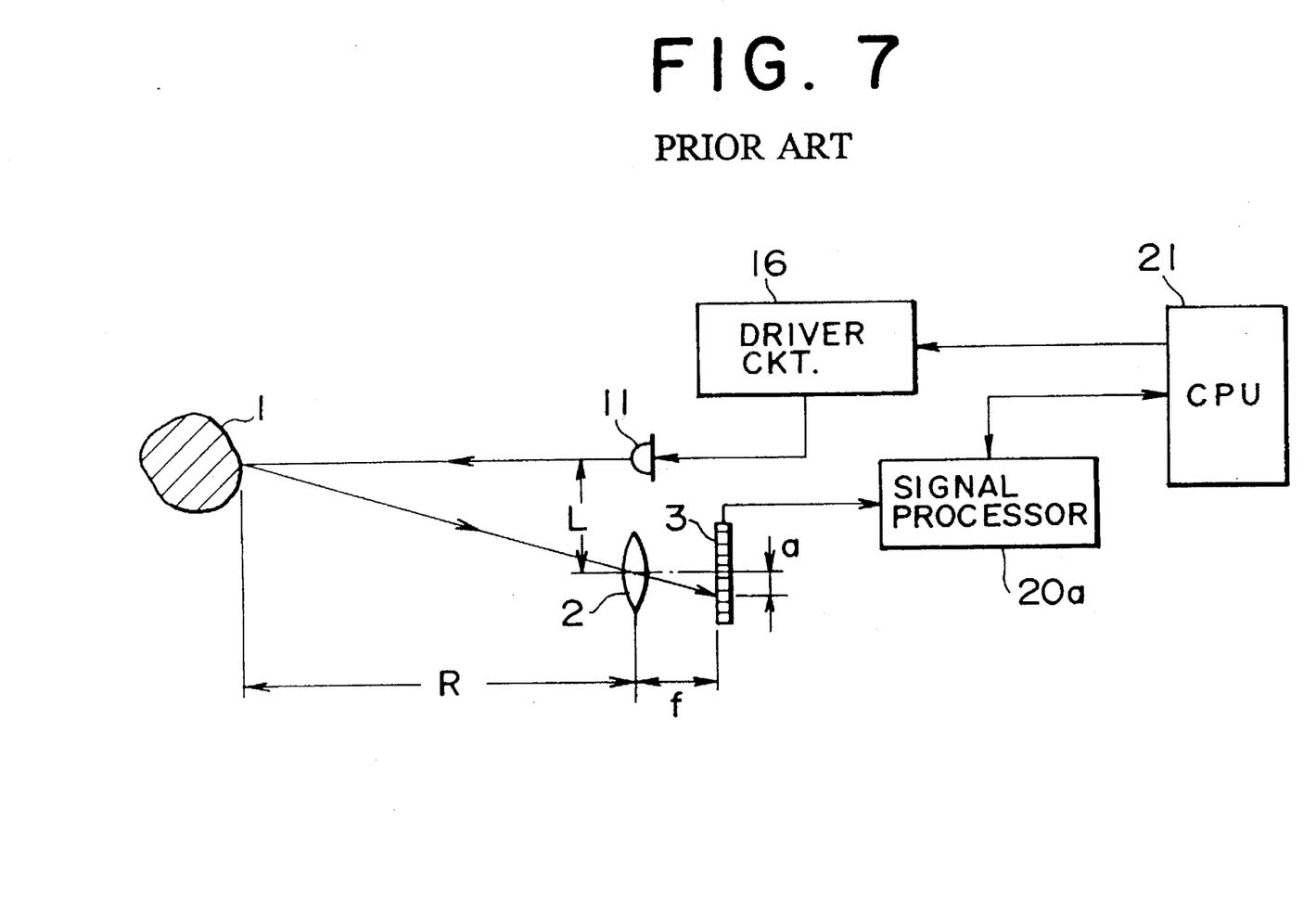
FIG. 7 is a block diagram showing the structure of another triangular, ion type distance measurement device.
Figure 8:
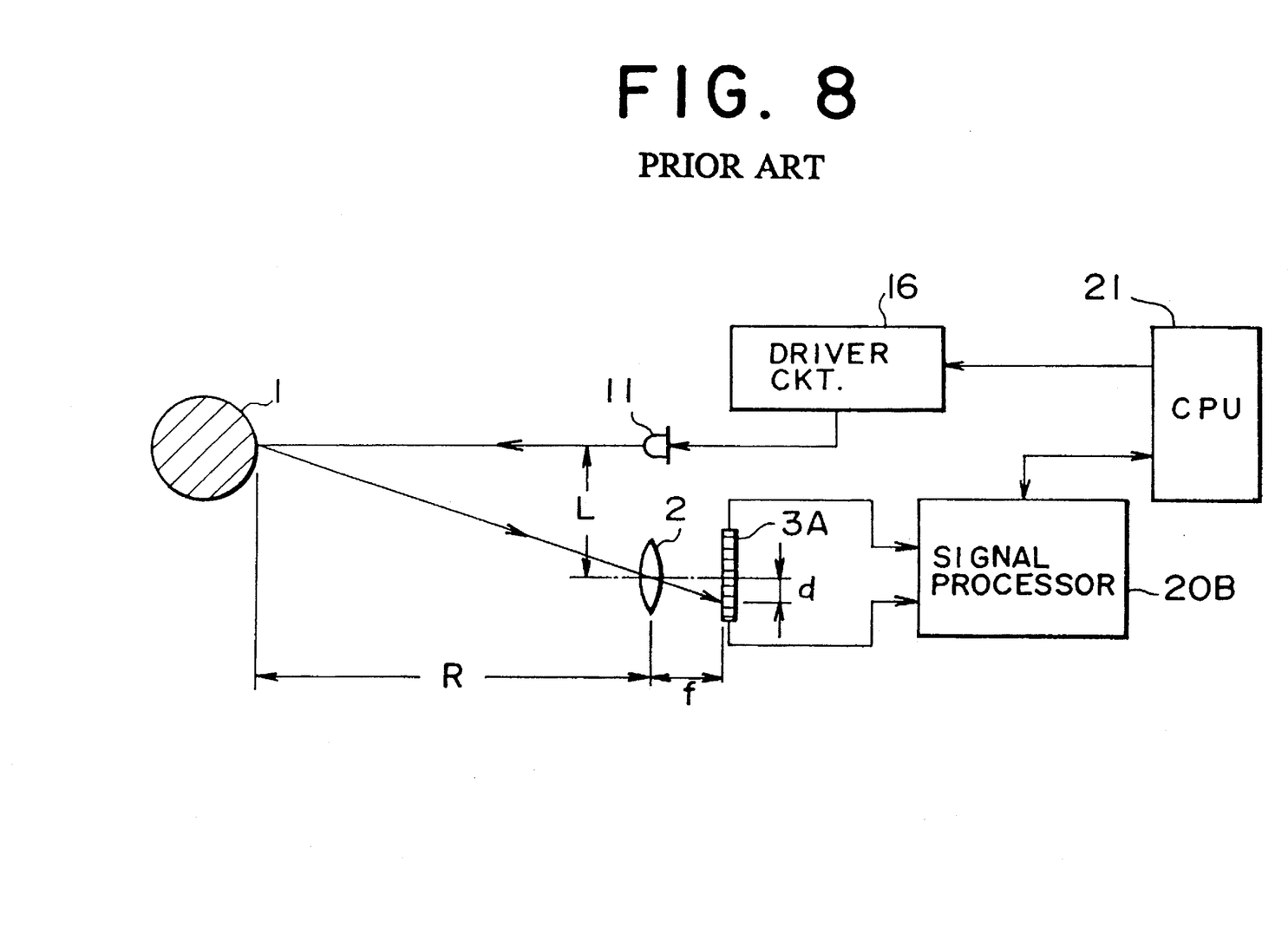
FIG. 8 is a block diagram showing the structure of another triangulation type distance measurement device, In the drawings, like reference numerals represent like or corresponding parts or portions.

FIG. 6 is a block diagram showing the structure of a trigonometric or triangulation type distance measurement device, which is disclosed, for example, in Japanese Patent Publication (Kokoku) No. 63-46363. FIG. 7 is a block diagram showing the structure of another triangulation type distance measurement device, which is disclosed, for example, in Japanese Patent Publication (Kokoku) No. 62-33522. FIG. 8 is a block diagram showing the structure of still another triangulation type distance measurement device, which is disclosed, for example, in Japanese Patent Publication (Kokoku) No. 63-44169.

The principle of the distance measurement by means of the triangulation type distance measurement device is described by reference to FIG. 6. The distance measurement device of FIG. 6 includes: first and second optical lens systems 2 and 12 separated by a lateral distance L; image sensors 3 and 13; analog-to-digital converters 4 and 14; RAMs (random access memories) 5 and 15; an image processor circuit 20; and a computer (CPU) 21.

The method of operation of the distance measurement device of FIG. 6 is as follows. The object 1 the distance to which is to be measured is at a distance R from the lenses 2 and 12 separated by a lateral distance L. Thus, the images of the object 1 formed on the image sensors 3 and 13, respectively, via the optical lens systems 2 and 12, are displaced by lateral distances a and b, respectively, from the centers of the image sensors 3 and 13 (i.e., the intersections with the optical axes of the lens systems 2 and 12). The images upon the sensors 3 and 13 are converted into corresponding analog electrical signals, and further into corresponding digital signals by means of the analog-to-digital converters 4 and 4. The digital image signals output from the analog-to-digital converters 4 and 14 are stored in the RAMs 5 and 15, respectively.

The computer (CPU) 21 reads out the digital image signals successively from the RAMs 5 and 15, and feeds them to the image processor circuit 20. Upon receiving the digital image signals, the image processor circuit 20 shifts the image of the RAM 5 (obtained via the optical lens system 2), for example, successively by a pixel relative to the image of the RAM (obtained via the optical lens system 12), and calculates the correlation (i.e., the degree of agreement) between the two images stored in the RAMs 5 and 15.

Namely, if the amount of the lateral shift measured in units of the lateral pitch of the pixels of the digital images is denoted by X, the image processor circuit 20 shifts the image of the RAM 5, for example, relative to the image of the RAM 15 by an amount X, and calculates the correlation C(X) of the two images at the amount of shift X. The correlation may be defined, for example, by $C(X)=-S(X)$, where $S(X)=\Sigma|p-q|$, the summands $|p-q|$ being the absolute values of the differences between the levels p and q of the corresponding pixels of the images in the RAMs 5 and 15, respectively. The amount of the shift X is successively incremented or decremented by a pixel pitch, to determine the value X at which the correlation C(X) takes the maximum value. The maximizing value X is the relative shift a+b of the images formed upon the image sensors 3 and 13.

Thus, the distance R to the object 1 is obtained by the following equation:

$$R=f \cdot L/\{(a+b) \cdot P\} \tag{1}$$

where f represents the focal distance of the lens systems 2 and 3, and P represents the lateral pitch of the pixels (i.e., the lateral separation between the centers of adjacent pixels) of the image sensors 3 and 13.

The distance measurement device of FIG. 7 includes, in addition to an optical lens system 2 and an image sensor 3, a light-emitting element 11 whose optical axis runs parallel to the optical axis of the optical lens system 2, at a lateral separation L. When the distance to an object 1 is measured, the light-emitting element 11 is driven by a driver circuit 16 in response to a control signal received from the computer (CPU) 21. A beam of light emitted from the light-emitting element 11 is reflected from the object 1 to the optical lens system 2. Thus, an image of the object 1 or a bright spot is formed upon the image sensor 3 at a lateral distance a from the center of the image sensor 3 (the intersection with the optical axis of the optical lens system 2). The signal from the image sensor 3 is fed to the signal processor circuit 20A, which determines the shift a of the spot formed upon the image sensor 3 with respect to the reference position (the intersection of the optical axis of the optical lens system 2 with the image sensor 3).

Thus, the distance R to the object 1 is obtained by the following equation:

$$R=f \cdot L/(a \cdot P) \tag{2}$$

where f represents the focal distance of the optical lens system 2, and P represents the lateral pitch of pixels of the image sensor 3.

The distance measurement device of FIG. 8 is similar to that of FIG. 7, but includes an analog image sensor 3A instead of a digital image sensor 3 of FIG. 7. The signal from the analog image sensor 3A is fed to the signal processor circuit 20B. If the shift of the image formed upon the analog image sensor 3A as measured in meters, is represented by d, the distance R to the object 1 is obtained by the following equation:

$$R=f \cdot L/d \tag{3}$$

where f represents the focal distance of the optical lens system 2.

The distance measurement devices of FIGS. 6 through 8 may be mounted on automotive vehicles to determine the inter-vehicle distances. Under such circumstances, the object 1 is the preceding vehicle which is running just ahead. It goes without saying that the distance measurement devices can be used alone to determine distances to any kind of object 1.

The distance measurement devices of FIGS. 6 through 8 are of the trigonometric or triangulation type. Japanese Laid-Open Patent (Kokai) No. 48-54631 and Japanese Patent Publication (Kokoku) No. 62-38760, on the other hand, disclose a vehicular distance measurement device which is not of the triangulation type, including: means for measuring the distance to a vehicle running ahead; means for determining a safe inter-vehicular distance; and means for controlling the velocity of the vehicle to keep the safe inter-vehicular distance. The distance measurement device uses a radar which emits a light or electromagnetic beam and, upon receiving the beam reflected from the object, determines the distance thereto from the length of time required by the beam to travel forward and backward. Provided that the beam hits on the object (the vehicle running ahead) correctly, the error of the measurement by the radar arises from the error the measurement the time length. The error is substantially independent of the magnitude of the distance to be measured.

In the case of the triangulation type distance measurement device, however, the distance R to the object is inversely proportional to the shift of the image. Thus, the error of distance measurement increases (and hence the resolution of the measurement decreases) as the distance to the object increases. The error can be generally regarded as random and the measurement fluctuates around the true distance.

The inter-vehicular distance measurement device using radar, on the other hand, has a problem from another cause. Namely, the vehicle on which the radar is mounted may shake or sway due to the road condition. The light or electromagnetic beam emitted from the radar mounted upon the running vehicle thus swings vertically and horizontally. The beam may mis-hit the preceding vehicle the distance to which is to be measured. The beam hits upon the road surface or a building at the road side, and is reflected therefrom to the radar. The measurement thus fluctuates. The fluctuation generally becomes greater as the distance to be measured increases. Further, when the distance to be measured is great, a small error in the direction of the beam may cause a mis-hit. The problem thus becomes more serious as the distance to be measured increases.

If the vehicle velocity is controlled on the basis of the measurement which fluctuates as discussed above, the vehicle velocity tend to follow the fluctuation of the measurement. The driving comfort is thus largely impaired. Reducing the control gain to improve the driving comfort causes another problem, since it also reduces the response speed. The driving safety may thus be placed in peril if a succeeding vehicle suddenly comes forward and forces its way between the driver's and the preceding vehicles.

SUMMARY OF THE INVENTION

It is therefore an object of this invention to provide a distance measurement device by which the effects of fluctuations are eliminated to obtain stable and accurate measurements, especially to an object at a long distance. A further object of this invention is to provide a driving control device fop maintaining a safe inter-vehicular distance by which the driving comfort is improved while realizing a quick response, fop example, to a vehicle forcing its way between the driver's and the preceding vehicle.

The first object is accomplished in accordance with the principle of this invention by a distance measurement device which comprises distance measurement means for measuring a distance to an object and outputting measurement values periodically; and filter (weighting) means, coupled to the distance measurement means, for adjusting the measurement values to obtain an output distance value, wherein a filter (weighting) constant of the filter (weighting) means takes a value corresponding to a current measurement value output from the distance measurement means. Preferably, the application of the filter (weighting means) is equivalent to taking a weighted average of a plurality of the measurement values, and the filter (weighting) constant is inversely proportional to the weight upon a current measurement value in taking the weighted average of a plurality of the measurement values. Further, it is preferred that the filter constant takes a greater value as the current measurement value increases. The distance measurement means may consist of a triangulation type distance measurement device including: optical means for forming an optical image of the object; signal processor circuit means, coupled to the optical means, for determining a shift of the optical image; and calculation means, coupled to the signal processor circuit means, for calculating a distance to the object on the basis of the shift.

The second object is accomplished by a vehicle velocity control device fop maintaining an inter-vehicular distance, which includes: distance measurement means mounted on a vehicle fop measuring a distance to another vehicle and outputting measurement values periodically filter (weighting) means, coupled to the distance measurement means, for applying a filter upon the measurement values to obtain an output distance value, wherein a filter (weighting) constant of the filter takes a value corresponding to a current measurement value output from the distance measurement means; and vehicle velocity control means, coupled to the filter means, for controlling a vehicle velocity of the vehicle on the basis of the output distance value supplied from the filter means such that the distance to the another vehicle is maintained at a target inter-vehicle distance.

Alternatively the vehicle velocity control device for maintaining an inter-vehicular distance, includes: distance measurement leans mounted on a vehicle for measuring a distance to another vehicle and outputting measurement values periodically; and vehicle velocity control means, coupled to the filter means, for controlling a vehicle velocity of the vehicle on the basis of the measurement values supplied from the distance measurement means, such that the distance to the another vehicle is maintained at a target inter-vehicle distance; wherein the vehicle velocity control means varies a control gain in correspondence with a current measurement value output from the distance measurement mean.

Still alternatively, the vehicle velocity control device for maintaining an inter-vehicular distance, includes: distance measurement means mounted on a vehicle for measuring a distance to another vehicle and outputting measurement values at a predetermined sampling period; deviation detection means, coupled to the distance measurement means, for calculating a deviation of current measurement value from a target inter-vehicle distance; calculation means, coupled to the deviation detection means, for calculating a parameter corresponding to the deviation; vehicle velocity control means, coupled to the calculation means, for controlling a vehicle velocity of the vehicle on the basis of the parameter, such that the distance to the another vehicle is maintained at the target inter-vehicle distance. Preferably, the parameter calculated by the calculation means is a sum of: (a) a component obtained by multiplying the deviation by a proportional gain; (b) a component obtained by multiplying an integral of the deviation with respect to time b an integral gain; and (c) a component corresponding to a factor obtained by multiplying a differential quotient of the deviation with respect to time by a differential gain. Still preferably, the calculation means decreases the proportional gain and/or the differential gain when the current measurement value output from the distance measurement means increases, and increases the proportional gain and/or the differential gain when the current measurement value output from the distance measurement means decreases.

It is also preferred that the calculation means comprises: filter means for applying a filter upon successive values of the factor obtained by multiplying a differential quotient of the deviation with respect to time by a differential gain. Preferably, the application of the filter is equivalent to taking a weighted average of a plurality of the successive values of the factor, and a filter constant is inversely proportional to the weight upon current value of the factor in taking the weighted average of a plurality of the successive values of the factor. It is further preferred that the filter constant varies as the current measurement value output from the distance measurement means changes, and more specifically that the filter constant increases as current measurement value output from the distance measurement means increases. Preferably, the filter constant is not less than four times the sampling period.

Still preferably, the proportional gain, the integral gain and the differential gain are varied in correspondence with current measurement value of the distance measurement means; and when a current value of the differential quotient exceeds a predetermined level, the proportional gain, the integral gain and the differential gain corresponding to an immediately preceding measurement value of distance measurement means is used in calculating the components.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

DETAILED DESCRIPTION OF THE PREFERRED EMBODIMENTS

Referring now to the accompanying drawings, the preferred embodiments of this invention are described, First, an embodiment of distance measurement device as applied to a triangulation type device is described. The triangulation type distance measurement device to which this invention is applied may be any one of those of FIGS. 6 through 8 discussed above. As to the structure and method of operation of the triangulation type distance measurement devices themselves, reference is to be made to the description above. According to this invention, a software filter implemented as a program stored in the computer (CPU) 21 is applied upon the direct results of measurement with fluctuations, to obtain a stable and accurate value of the distance to an object.

Figure 1:
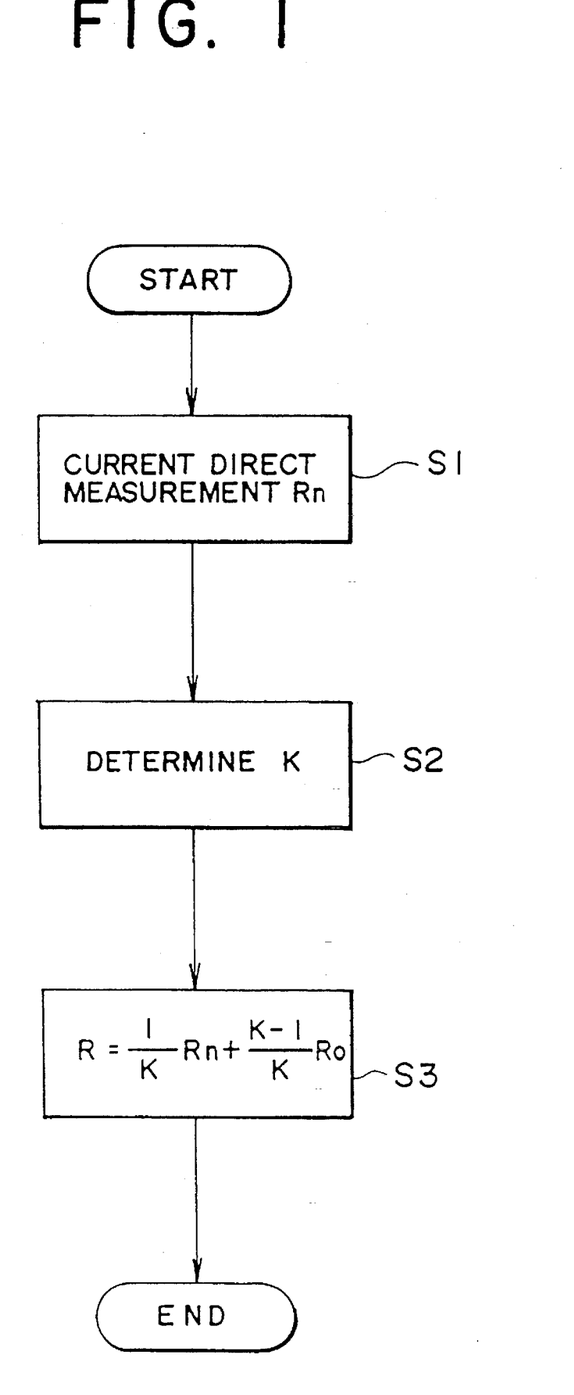
FIG. 1 is a flowchart showing a method of determining the distance to an object according to this invention.

FIG. 1 is a flowchart showing a method of determining the distance to an object according to this invention. The software filter according to this invention is implemented as a procedure executed by the computer (CPU) 21. When the computer (CPU) 21 calculates the distance, the procedure of FIG. 1 is executed to determine the distance to apply a filter upon the values obtained directly by the measurement. Namely, a weighted average of a number of sample measurement values is taken over a travel ling distance to obtain the distance. The number of samples is increased (i.e., the filter constant becomes greater) as the distance to be measured becomes greater, so that a stable and accurate (high-resolution) measurement can be obtained over a wide range from a short to a long distance.

At step S1 in FIG. 1, the distance is determined as discussed above using equation (1), from the amount of shift which maximizes the correlation C(X). The distance may be determined using equation (2) or (3). The distance is calculated for each 60 milliseconds, and the current value thereof is denoted by $R_n$.

As described below, the value of the distance as determined at a subsequent step S3 during the preceding execution cycle of the procedure of FIG. 1 is stored in a variable $R_0$ in the memory of the computer (CPU) 21, etc. At step S2, a filter constant K is determined using a table stored in the memory of the computer (CPU) 21, the contents of which is shown in the following table 1. The values of $R_0$ in the first row are shown in meters. Thus, for or example, if the variable $R_0$ is equal to 45 meters ($R_0$=45), then the filter constant K is equal to 4 (K=4).

TABLE 1

| $R_0$ | 0–20 | 20–30 | 30–40 | 40–50 | 50–70 | 70–100 | 100–150 | above 150 |
|---|---|---|---|---|---|---|---|---|
| K | 1 | 2 | 3 | 4 | 6 | 8 | 10 | 12 |

At step S3, using the filter constant K obtained at the preceding step S2, the distance R is calculated by applying a software filter. Namely, the distance R is calculated by the following equation:

$$R=(R_n/K)\cdot(K-1)\cdot R_0/K \tag{4}$$

The value R obtained b the above equation (4) is equal to a weighted average of a number of previous measurement values $R_n$ (obtained at step S1 during the current and the previous execution cycles of the procedure of FIG. 1). Thus, the calculation by the above equation (4) is equivalent to applying a filter to the measurement values $R_n$, which may be regarded as sample values of a time function R(t). It is noted that as the value of constant K becomes smaller, the influence of the current measurement value $R_n$ becomes greater (i.e., the weight on the current sample value becomes greater). On the other hand, as the constant K becomes greater, the influence of the preceding measurement values becomes greater (i.e., the weights on the previous sample values become greater). The constant K is thus analogous to the time constant of a physically implemented filter. As shown in the above table 1, the constant K is increased as the distance to be measured becomes greater.

At step S3, the variable $R_0$ is also updated. Namely, the variable $R_0$ is assigned the value obtained at the current step S3 using equation (4). The execution of the procedure of FIG. 1 is repeated each 60 milliseconds, and outputs the value R as determined by equation (4) at step S3.

Figure 3:
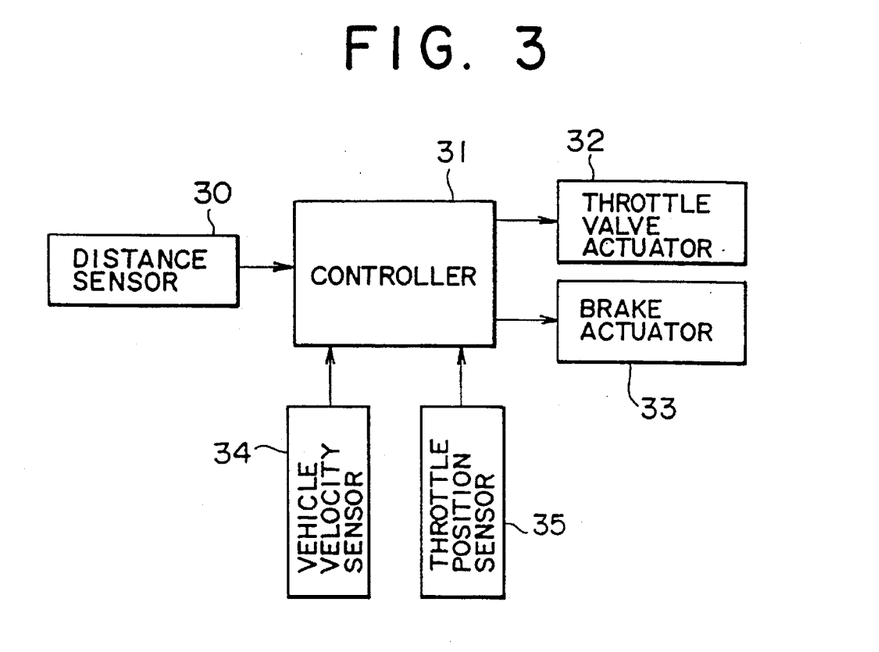
FIG. 3 is a block diagram showing the structure of a automotive control device according to this invention for controlling the vehicle velocity to maintain an appropriate inter-vehicular distance.

FIG. 3 is a block diagram showing the structure of an automotive control device according to this invention for controlling the vehicle velocity to maintain an appropriate inter-vehicular distance. A distance sensor 30, which may either be a triangulation type or a radar type distance measurement device, measures the distance to a preceding vehicle running ahead. A controller 31 consists of a microcomputer, input/output interfaces, etc. A throttle valve actuator 32 drives the throttle valve for adjusting the opening of the air-intake passage to the engine of the vehicle. The throttle valve actuator 32 thus controls the output power of the engine. A brake actuator 33 operates the brake to decelerate the vehicle. The vehicle velocity and the throttle valve position (the opening degree of the throttle valve) are detected by a vehicle velocity sensor 34 and a throttle position sensor 35, respectively. In accordance with the input signals supplied from the distance sensor 30, the vehicle velocity sensor 34 and the throttle position sensor 35, the controller 81 controls the throttle valve actuator and the brake actuator 33 and adjusts the vehicle velocity.

Figure 4:
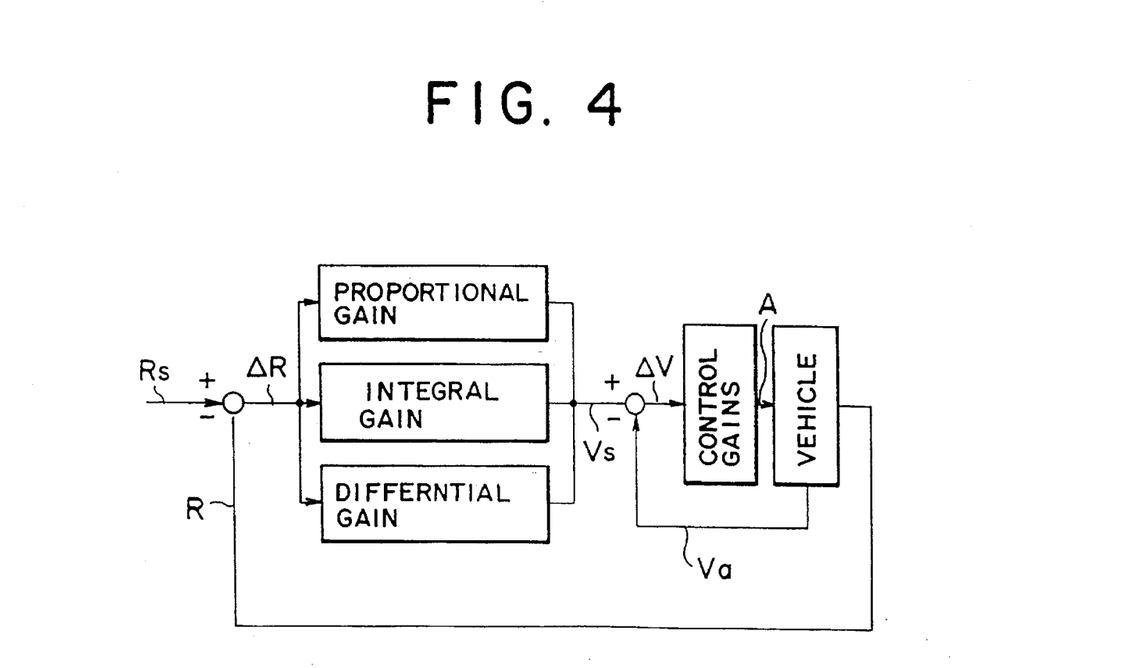
FIG. 4 is a block diagram showing the functional structure of a system for controlling the vehicle velocity to maintain an appropriate inter-vehicular distance in accordance with the PID (proportional plus integral plus differential) control method.
Figure 4A:
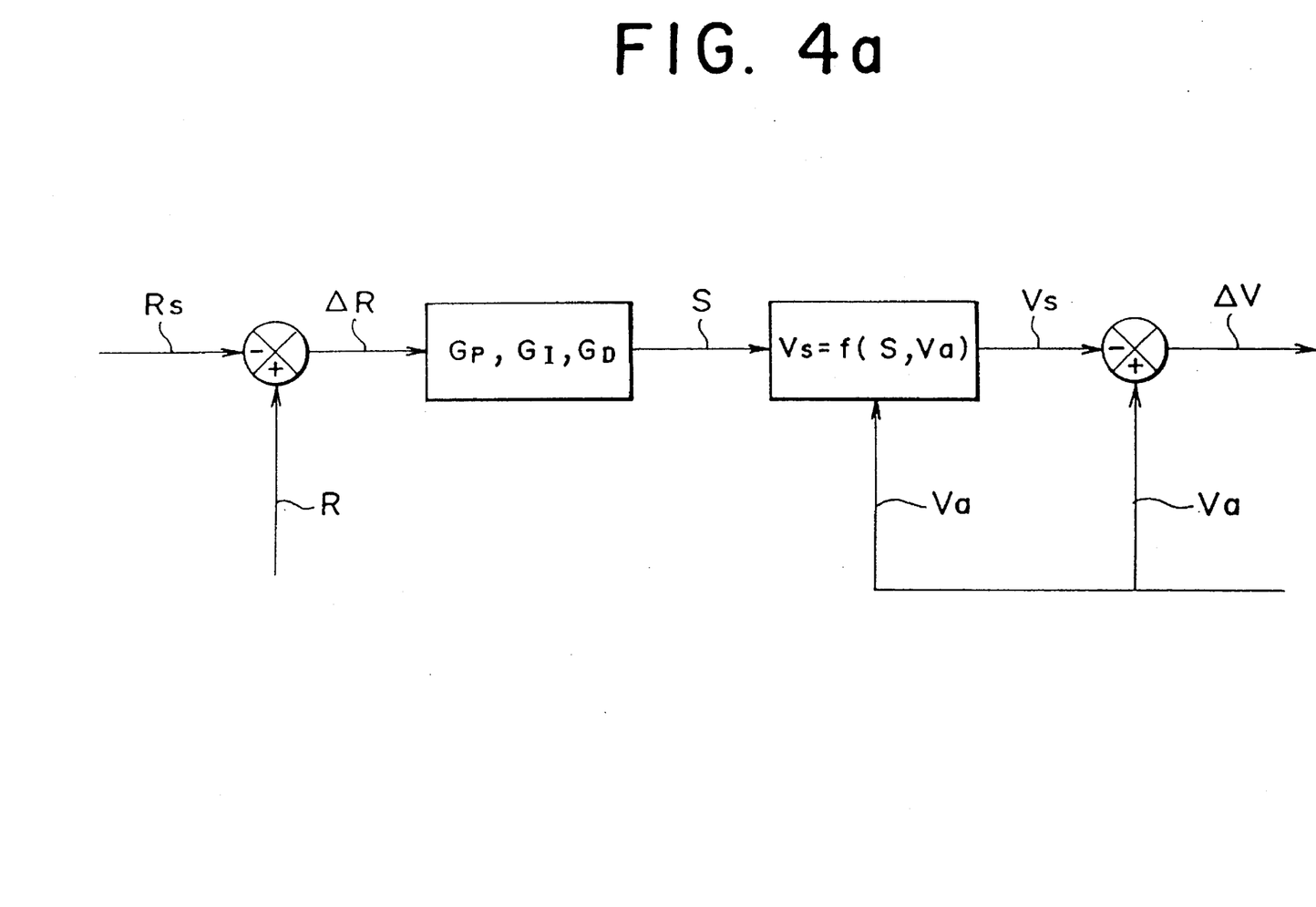
FIG. 4a is a block diagram showing a structure of the part of the system of FIG. 4 by which the target vehicle velocity Vs is determined.

FIG. 4 is a block diagram showing the functional structure of a system for controlling the vehicle velocity to maintain an appropriate inter-vehicular distance in accordance with the PID (proportional plus integral plus differential) control method. FIG. 4a is a block diagram showing a structure of the part of the system of FIG. 4 by which the target vehicle velocity Vs is determined. The vehicle velocity is detected by means of the vehicle velocity sensor 34, and the target inter-vehicular distance $R_S$ corresponding to the vehicle velocity is calculated. The deviation $\Delta R=R-R_S$ of the current Measurement value R of the inter-vehicular distance from the target inter-vehicular distance $R_S$ is calculated. The measurement value R may be determined by one of the distance measurement devices of FIGS. 1 through 3. The target vehicle velocity $V_S$ is calculated from the deviation $\Delta R$ by: (a) multiplying $\Delta R$ by the proportional gain $G_P$; (b) integrating $\Delta R$ over an integral time $T\gamma$ and then multiplying the integral $\int \Delta R \cdot dt$ by the integral gain $G_r$; (c) differentiating $\Delta R$ by the time t and then multiplying the differential quotient d $\Delta R/dt$ by the differential gain $G_D$; and (d) adding the terms obtained by the above steps (a) through (c), thereby obtaining the sum S:

$$S=G_P\cdot\Delta R+G_I\int\Delta R\cdot dt+G_D\cdot(d\Delta R/dt)$$

As shown in detail in FIG. 4a, the target vehicle velocity $V_S$ May be determined as a Function $V_S = f(S,Va)$ of the above sum S and the actual vehicle velocity Va.

Further, the deviation a $\Delta V=Va-V_S$ of the current actual vehicle velocity Va (as detected by the vehicle velocity sensor 34) from the target vehicle velocity $V_S$ is calculated. The controlled amount A are obtained by the steps similar to steps (a) through (d) above, multiplying the deviation $\Delta V$, etc., by the control gains (the proportional, the integral and the differential gains). Further, the controlled magnitudes of the throttle valve actuator 32 and the brake actuator 33 are determined from the controlled amount A. The vehicle velocity is thus controlled to the target vehicle velocity $V_S$, such that the actual inter-vehicular distance R is adjusted to the target $V_S$.

Figure 2:
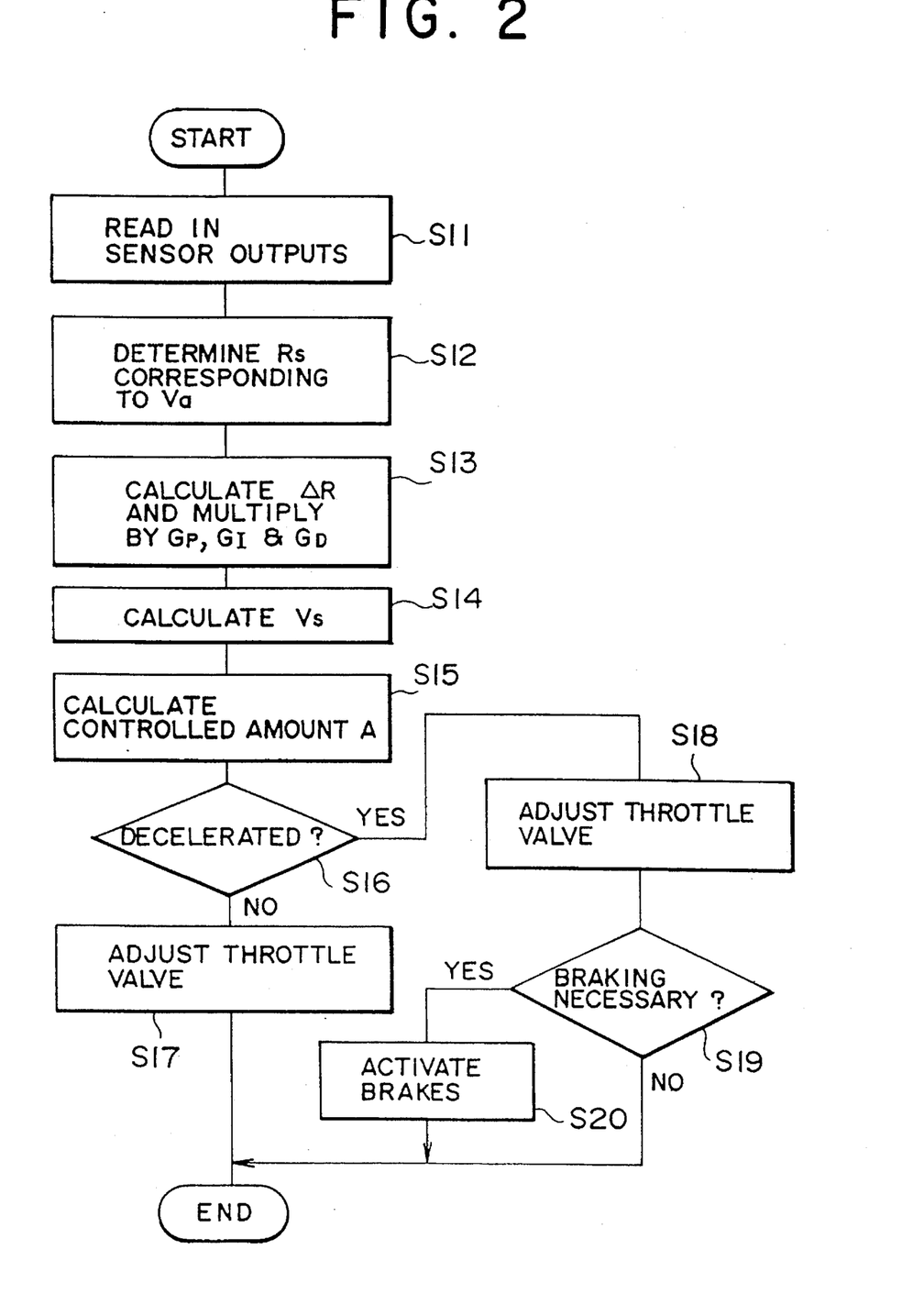
FIG. 2 is a flowchart showing the procedure by which the controller 31 of FIG. 3 controls the vehicle velocity to adjust the inter-vehicular distance.

FIG. 2 is a flowchart showing the procedure by which the controller 31 of FIG. 3 controls the vehicle velocity to adjust the inter-vehicular distance. The distance sensor 30 measures the inter-vehicular distance R and outputs the result of the measurement. The vehicle velocity sensor 34 detects the vehicle velocity Va and outputs the signal representing the vehicle velocity. The throttle position sensor 35 detects the position or the opening degree of the throttle valve and outputs the throttle valve position signal representing the opening degree of the throttle valve. At step S11, the controller 31 reads in the output signals from the distance sensor 30, the vehicle velocity sensor 34 and the throttle position sensor 35, which represent the inter-vehicular distance R, the vehicle velocity Va, and the throttle valve opening degree, respectively.

At step S2, the target inter-vehicular distance $R_S$ corresponding to the actual vehicle velocity Va detected by the vehicle velocity sensor 34 is calculated. The target inter-vehicular distance $R_S$ may be calculated by the following equation (5), such that the target inter-vehicular distance $R_S$ is proportional to the square of the actual vehicle velocity Va:

$$R_S=C_0\cdot Va^2 \tag{5}$$

where $R_S$ is the target inter-vehicular distance, $C_0$ is a proportional constant, and Va is the actual vehicle velocity. The constant Ce may depend upon the road or weather condition. The inter-vehicular distance $R_S$ may also be determined using a data table stored in the memory of the controller 31 which shows the relation between the inter-vehicular distance and the vehicle velocity.

At step S18, the deviation $\Delta R=R-R_S$ of the measurement value R from the target inter-vehicle distance $R_S$ is calculated. Further, the deviation $\Delta R$ is multiplied by the proportional Main $G_P$, to obtain $G_P\cdot\Delta R$, which is proportional to the deviation $\Delta R$. The deviation $\Delta R$ is multiplied by the (relatively small) integral gain $G_I$ to obtain $G_I\cdot\Delta R$, and the current value thereof is added to the preceding value thereof, to obtain an approximate value of the integral $\int G_I\cdot\Delta R\cdot dt = G_I\int\Delta R\cdot dt$, where the integral time $T_I$ over which the integral is taken may be regarded as equal to two times the period of the execution cycle of the procedure of FIG. 2. The rate of change $d\Delta R/dr$ (which is approximately equal to the differential quotient) of $\Delta R$ over the period of the execution cycle of the procedure of FIG. 2 is calculated, and the rate of change d $\Delta R/dr$ is multiplied by the (relatively large) differential gain $G_D$, to obtain $G_D \cdot d\Delta R/dt$. The terms obtained are added, thereby obtaining the sum:

$$S = G_P \cdot \Delta R + G_I \cdot \int \Delta R \cdot dt + G_D \cdot (\Delta R/dt) \quad (6)$$

The proportional gain $G_P$, the integral gain $G_I$, and the differential Main $G_P$ are varied in accordance with the measurement value R of the inter-vehicular distance. A data able showing the values of the gains relative to the measurement value R of the inter-vehicular distance is stored in the memory of the controller 31, and the values of the gains $G_P$, $G_I$, and $G_D$ are determined by looking up the table.

when the measurement value R of the inter-vehicular distance is great, the fluctuation thereof also is great. Thus, the proportional and differential gains GP and Gu should be very small, such that the vehicle velocity control is performed primarily in accordance with the integral control method (i.e., by means of the integral term $G_I \cdot \int \Delta R \cdot dt$). When the inter-vehicular distance is great, the danger of collision or accident is slight even if there is some response delay in adjusting the inter-vehicular distance to the target inter-vehicle distance. Under such circumstances, it is preferable to vary the vehicle velocity gradually and smoothly to improve the driving comfort, by primarily adopting the integral control.

When, on the other hand, the measurement value R of the inter-vehicular distance is small, the fluctuations thereof is also small. Further, if the rate of change of the inter-vehicular distance is great, the danger of collision of the vehicles become serious. Thus, when the rate of change $d\Delta R/dt$ is negative (i.e., when the vehicle on which the controller is mounted is approaching the preceding vehicle running ahead), it is preferable to increase the differential gain $G_D$ and/or the proportional gain $G_P$ to enhance the response speed of the vehicle velocity control. The data table showing the relation between the measurement value R of the inter-vehicular distance and the gains $G_P$, $G_I$ and $G_D$ stores the values of gains corresponding to the measurement value R as discussed above.

At step S14, the target vehicle velocity $V_S$ is calculated. The target vehicle velocity $V_S$ may be a function $V_S = f(S, Va)$ of the sum S and the vehicle velocity Va. The value of the function may be calculated using a formula representing the function, or may be determined by looking up the table in which the values of the function are tabulated in relation to the values of the sum 5 and the vehicle velocity Va.

At step S15, the deviation $\Delta V = Va - V_S$ of the measurement value of the vehicle velocity Va from the target vehicle velocity $V_S$ is calculated, and calculations similar to those performed with respect to the deviation $\Delta R$ at step S13 is performed with respect to the deviation $\Delta V$ to obtain the controlled amount A. The proportional gain, the integral gain, and the differential gain used in the calculations are read out from a table storing the values of the gains corresponding to the inter-vehicular distance or the vehicle velocity.

At step S16, it is judged from the polarity of the controlled amount A whether or not the vehicle is to be decelerated. If the judgment is negative at step S16 (i.e., if the vehicle velocity is to be accelerated), the execution proceeds to step S17, where the degree by which the throttle valve is opened relative to the current position (i.e., the controlled amount $A_1$ of the throttle valve actuator 32) is calculated from the controlled amount A determined at step S15 and the current throttle valve position detected by the throttle position sensor 35. The result of the calculation is output to the throttle valve actuator 39, and the opening of the throttle valve is adjusted accordingly. The procedure is terminated after step S17.

On the other hand, %f the judgment is affirmative at step S16 (i.e., if the vehicle velocity is to be decelerated), the execution proceeds to step S18, where the degree by which the throttle valve is closed relative to the current position (i.e., the controlled amount $A_1$ of the throttle valve actuator 32) is calculated from the controlled amount A determined at step S15 and the current throttle valve position detected by the throttle position sensor 35. The result of the calculation is output to the throttle valve actuator 32 and the opening of the throttle valve is adjusted accordingly.

At step S19, it is judged whether or not the braking operation is necessary, in addition to the adjustment of the throttle valve by the amount $A_1$, to realize the required deceleration indicated by the controlled amount A. If the judgment is negative at step S19 (if the bakjng is not needed), the procedure is terminated. On the other hand, if the judgment is affirmative at step S19 ( if the braking is needed), the execution proceeds to step S20, where the controlled amount $A_2$ of the brake actuator 33 is calculated from the controlled amount A determined at step S15 and the controlled amount $A_1$ of the throttle valve actuator 32 determined at step S18. The result $A_2$ of the calculation is output to the brake actuator 33 to activate the brakes by a strength corresponding to the controlled amount. The procedure is terminated after step S20.

The procedure of FIG. 2 is repeated to control the inter-vehicular distance R to the target inter-vehicle distance $R_S$.

It is noted that the distance sensor 30 may be a triangulation type distance measurement device and the controller 31 may be provided with the filter function for applying the software filter as described above referring to FIG. 1, wherein the filter constant K is varied in accordance with the measurement value $R_n$ of the inter-vehicular distance. Then, the control gains may be fixed instead of varying them in accordance with the measurement values of the inter-vehicular distance and the vehicle velocity. For short distance measurement, the filter constant K may be selected at a small value, to improve he resolution and the response speed. Then, the inter-vehicular distance can be controlled quickly and an alarm may be given to the driver before too late. For long distance measurement, the filter constant K may be selected at a large value, such that, although the response may be delayed a little, the inter-vehicular distance can be measured stably with a high-resolution and the driving comfort is improved.

The distance sensor 30, which may be a triangulation type distance measurement device or a distance measurement device using a radar, outputs the measurements at a predetermined sampling period $\Delta t$. Thus, when the fluctuation of the measurement is great, the rate of change $d\Delta R/dt$ of the deviation $\Delta R$ of the inter-vehicular distance R may fluctuate between the positive and the negative values, or may abruptly take a large value. Thus, a filter may be applied upon the value of $d\Delta R/dr$ to improve the driving comfort.

Figure 5:
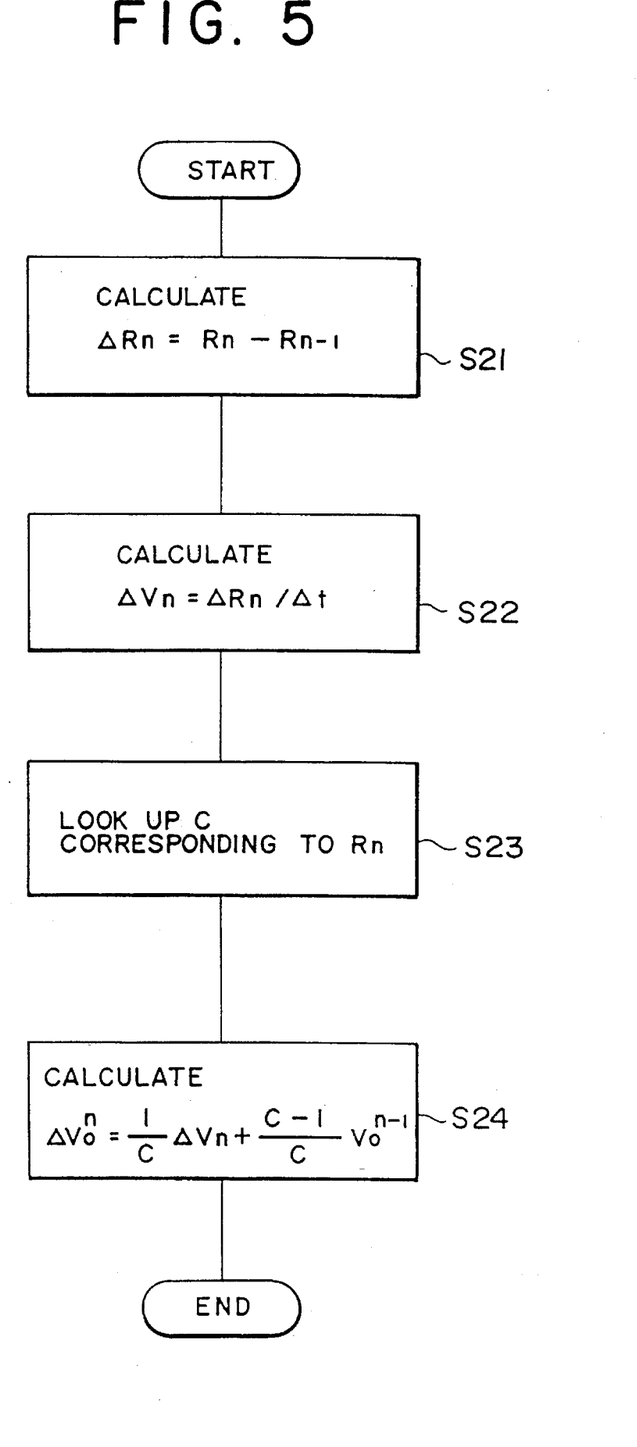
FIG. 5 is a flowchart showing the procedure by which a software filter is applied upon the rate of change d ΔR/dt of deviation ΔR of the inter-vehicular distance R from the target level Rs.

FIG. 5 is a flowchart showing the procedure by which a software filter is applied upon the rate of change $d\Delta R/dt$ of deviation $\Delta R$ of the inter-vehicular distance R from the target level $R_S$ When a long distance s to be measured, the differential gain $G_D$ is selected at a smaller value at step S13 in the procedure of FIG. 2. The contribution of the differential term to the vehicle velocity control, however, is not negligible, and hence may exert an adverse influence upon the driving comfort. The filtering process of FIG. 5 thus aims at eliminating the adverse effects of the random fluctuations of $d\Delta R/dt$.

At step S21 in FIG. 5, the difference $\Delta R_n = Rn - Rn-1$ between the current measurement value $R_n$ of the inter-vehicular distance and the preceding measurement value $Rn-1$ thereof. It is noted that the symbol $\Delta$ here is used to represent an increment of the measurement value R of the inter-vehicular distance, and not the deviation thereof with respect to the target value $R_S$. At step S22, the rate of change $\Delta V_n = \Delta R_n/\Delta t$ of the measurement value R is calculated from the difference $\Delta R$. and the sampling or measurement period $\Delta t$. The rate of change $\Delta V_n = \Delta R_n/\Delta t$ is calculated as an approximate value of the rate of change d $\Delta R/dt$. At step S23, the filter constant C corresponding to the current measurement value $R_n$ of the inter-vehicular distance is looked up from a table storing the relation between the filter constant C and the inter-vehicular distance.

The preceding value of the rate of change of the inter-vehicular distance obtained at step S24 of FIG. 5 is denoted by $\Delta V_0^{n-1}$ as described below. The current value of the rate of change $\Delta V_0^n$ is calculated at step S24 by the following equation:

$$\Delta V_0^n = (\Delta V_n/C) + (C-1) \cdot \Delta V_0^{n-1}/C \qquad (7)$$

By selecting a large value of the filter constant C, the influence of the fluctuation of the measurement values of the inter-vehicular distance can be reduced. The value $\Delta V_0^n$ is used at step S13 in the procedure of FIG. 2 instead of the rate of change $d=R/dt$. The differential gain $G_D$ may be determined described above, or may be only slightly dependent upon the inter-vehicular distance R, or may be fixed. The filter constant C may be selected at a large value for a long inter-vehicular distance measurement where the fluctuation of the measurement values thereof is great. The driving comfort is thereby improved although the response speed is reduced. On the other hand fop a short inter-vehicular distance measurement, the filter constant C may be selected at a small value. The response speed is thereby enhanced and the danger of collision of the vehicles, etc., can be safely avoided.

If the distance sensor 30 performs the image processing to determine the inter-vehicular distance, about 0.03 seconds is generally necessary for sampling an image frame. Further time is required for calculating the distance. Thus, a total of from 0.05 to 0.1 seconds is needed for determining a measurement value. The measurement values of the inter-vehicular distance are thus output at the period of 0.05 to 0.1 seconds. Taking into consideration the bouncing movement and the lateral swaying of the vehicle due to the road condition, the filter constant C is preferably at about 0.2 seconds in such case. Namely, the filter constant C is preferred to be set at four times the sampling period (0.05 to 0.1 seconds). The value (0.2 seconds) of the filter constant C given above is four times the smaller limit (0.05 seconds) of the sampling period. The latter value of the filter constant improves the driving comfort but reduces the response speed of the vehicle velocity control, which limits the greatest value the filter constant C may take.

Further, if the rate of change of the measurement value of the inter-vehicular distance exceeds a predetermined level at step S13 in the procedure of FIG. 2, the gains $G_P$, $G_I$ and $G_D$ corresponding to the preceding measurement value, instead of those corresponding to the current measurement value, of the inter-vehicular distance R may be used. The adverse effects of a large abrupt error due, for example, to the external noise or the bouncing movement of the vehicle, can thus be minimized.

It is noted that the rate of change $\Delta V_n = \Delta R_n/\Delta t$ of the measurement value R of the inter-vehicular distance gives an approximate value of the true rate of change (differential quotient) $dR/dr$. Further, the rate of change d $\Delta R/dt$ of the deviation $\Delta R$ of the measurement value R from the target inter-vehicle distance $R_S$ is equal to $dR/dt$, provided that the target inter-vehicle distance is constant, since $\Delta R = R - R_S$. The target inter-vehicle distance $R_S$ is constant or at least changes very little compared with R. Thus, the values $\Delta V_n = \Delta R_n/\Delta t$ and $d\Delta R/dt$ may be used interchangeably. At step S13 in FIG. 2, for example, the value $\Delta V_n = \Delta R_n/\Delta t$ may be used instead of $d\Delta R/dt$. A similar approximation may be used to calculate the rate of change $dV/dt$ of the vehicle velocity at step S15 in FIG. 2.

What is claimed is:

1. A distance measurement device comprising:

distance measurement means for measuring a distance to an object and outputting measurement values periodically;

a weighting means operable to adjust each of said measurement values by weighting each of said measurement values with at least one of previously measured value and previously adjusted measurement value to obtain a currently adjusted distance value; and selecting means for selecting a weighing constant of said weighting means, from a plurality of weighting constants, depending upon a current measurement value output from said distance measurement means;

wherein said weighing means uses said selected weighting constant to adjust the currently measured value to thereby provide said currently adjusted distance value.

2. A distance measurement device as claimed in claim 1, wherein said weighting means calculates a weighted average of said current measurement value and a plurality of previous ones of said measurement values, and wherein a weight assigned to said current measurement value in taking said weighted average of a plurality of said measurement values is set inversely proportional to said weighting constant.

3. A distance measurement device as claimed in claim 2, wherein said weighting constant takes on a greater value as said current measurement value increases.

4. A distance measurement device as claimed in claim 1, wherein said distance measurement means comprises a triangulation type distance measurement device including:

optical means for forming an optical image of said object;

signal processor circuit means, coupled to said optical means, for determining a shift of said optical image; and calculation means, coupled to said signal processor circuit means, for calculating said distance to said object on the basis of said shift.

5. A vehicle velocity control device for maintaining an inter-vehicular distance comprising:

distance measurement means mounted on a vehicle for measuring a distance to another vehicle and outputting measurement values periodically;

weighting means operable to adjust each of said measurement values by weighting each of said measurement values with at least one of previously measured value and previously adjusted measurement value to obtain a currently adjusted distance value;

selected means for selecting a weighting constant of said weighting means from a plurality of weighting constants depending upon a current measurement value output from said distance measurement means;

wherein said weighting means uses said selected weighting constant to adjust the currently measured value to thereby provide said currently adjusted distance value; and vehicle velocity control means, coupled to said weighting means, for controlling a vehicle velocity of said vehicle on the basis of said currently adjusted distance value supplied from said weighting means, such that said distance to said another vehicle is maintained at a target inter-vehicle distance.

6. A vehicle velocity control device for maintaining an inter-vehicular distance, comprising:

distance measurement means mounted on a vehicle for measuring a distance to another vehicle and outputting measurement values at a predetermined sampling period;

a weighting means operable to adjust each of said measurement values by weighting each of said measurement values and a previously adjusted measurement value to obtain a currently adjusted distance value;

selecting means for selecting a weighting constant of said weighting means from a plurality of weighting constants depending upon a current measurement value output from said distance measurement means;

wherein said weighting means uses said selected weighting constant to adjust the currently measured value to thereby provide said currently adjusted distance value;

deviation detection means, coupled to said distance measurement means, for calculating a deviation of said currently adjusted distance value from a target inter-vehicle distance;

calculation means, coupled to said deviation detection means, for calculating a parameter corresponding to said deviation; and vehicle velocity control means, coupled to said calculation means, for controlling a vehicle velocity of said vehicle on the basis of said parameter, such that said distance to said another vehicle is maintained at said target inter-vehicle distance.

7. A vehicle velocity control device as claimed in claim 6, wherein said parameter calculated by said calculation means is a sum of: (a) a component obtained by multiplying said deviation by a proportional gain; (b) a component obtained by multiplying an integral of said deviation with respect to time by an integral gain; and (c) a component corresponding to a factor obtained by multiplying a differential quotient of said deviation with respect to time by a differential gain.

8. A vehicle velocity control device as claimed in claim 8, wherein:

said calculation means decreases at least one of said proportional gain and said differential gain when said current measurement value output from said distance measurement means increases, and increases at least one of said proportional gain and said differential gain when said current measurement value output from said distance measurement means decreases.

9. A vehicle velocity control device as claimed in claim 7, wherein said calculation means comprises: a second weighting means operable to weight successive values of said parameter by multiplying a differential quotient of said deviation with respect to time by a differential gain.

10. A vehicle velocity control device as claimed in claim 9, wherein said second weighting means calculates a weighted average of a plurality of said successive values of said parameter, and wherein a weight assigned to a current value of said parameter in taking said weighted average of a plurality of said successive values of said parameter is inversely proportional to said weighting constant.

11. A vehicle velocity control device as claimed in claim 10, wherein said weighting constant varies as said current measurement value output from said distance measurement means changes.

12. A vehicle velocity control device as claimed in claim 11, wherein said weighting constant increases as said current measurement value output from said distance measurement means increases.

13. A vehicle velocity control device as claimed in claim 9, wherein said weighting constant is not less than four times said sampling period.

14. A vehicle velocity control device as claimed in claim 7, wherein:

said proportional gain, said integral gain and said differential gain are varied in correspondence with said current measurement value of said distance measurement means; and when said current value of said differential exceeds a predetermined level, said proportional gain, said integral gain and said differential gain corresponding to an immediately preceding measurement value of said distance measurement means is used in calculating said components.

15. A vehicle velocity control device for maintaining an inter-vehicular distance, comprising:

distance measurement means mounted on a vehicle for measuring a distance to another vehicle and outputting measurement values at a predetermined sampling period;

calculation means, coupled to said distance measurement means, for calculating a differential of said measurement values with respect to time;

weighting means operable to weight successive values of said differential of said measurement values with respect to time, said weighting means calculating a weighted average of a plurality of said successive values of said differential, wherein a weight assigned to a current value of said differential in taking said weighted average of a plurality of said successive values of said differential is inversely proportional to a weighting constant; and vehicle velocity control means, coupled to said distance measurement means and said weighting means, for controlling a vehicle velocity of said vehicle on the basis of said measurement values in accordance with proportional plus integral plus differential control, such that said distance to said another vehicle is maintained at said target inter-vehicle distance; wherein a differential control value of said proportional plus intergral plus differential control is obtained by multiplying an output of said weighting means by a differential gain.

16. A vehicle velocity control device as claimed in claim 15, wherein said weighting constant varies as said current measurement value output from said distance measurement means changes.

17. A vehicle velocity control device as claimed in claim 16, wherein said weighting constant increases as current measurement value output from said distance measurement means increases.

18. A vehicle velocity control device as claimed in claim 15, wherein said weighting constant is not less than four times said sampling period.

19. A vehicle velocity control device as claimed in claim 15, wherein:

control gains of said proportional plus integral plus differential control are varied in correspondence with current measurement value of said distance measurement means; and when a current value of said differential exceeds a predetermined level, aid control gains corresponding to an immediately preceding measurement value of distance measurement means are used in said proportional plus integral plus differential control.

* * * * *